US 7,166,806 B2

(12) United States Patent
Menschig et al.

(10) Patent No.: US 7,166,806 B2
(45) Date of Patent: Jan. 23, 2007

(54) MICRO-FUNCTIONAL UNIT

(75) Inventors: Arnd Menschig, Weil im Schoenbuch (DE); Marcus Scholl, Stolberg (DE)

(73) Assignee: Milasys GBR, Weil im Schoenbuch (DE)

(*) Notice: Subject to any disclaimer, the term of this patent is extended or adjusted under 35 U.S.C. 154(b) by 197 days.

(21) Appl. No.: 10/264,351

(22) Filed: Oct. 2, 2002

(65) Prior Publication Data

US 2003/0076664 A1 Apr. 24, 2003

Related U.S. Application Data

(63) Continuation of application No. PCT/EP01/03818, filed on Apr. 4, 2001.

(30) Foreign Application Priority Data

Apr. 5, 2000 (DE) ................................. 100 16 869

(51) Int. Cl.
*H05K 1/03* (2006.01)
*H05K 1/16* (2006.01)
(52) U.S. Cl. ...................... 174/260; 174/255
(58) Field of Classification Search ........ 174/254–259, 174/260
See application file for complete search history.

(56) References Cited

U.S. PATENT DOCUMENTS

| 5,097,354 | A | | 3/1992 | Goto |
| 5,315,411 | A | | 5/1994 | Blanding |
| 5,848,206 | A | | 12/1998 | Labeye et al. |
| 5,920,417 | A | | 7/1999 | Johnson |
| 5,952,572 | A | * | 9/1999 | Yamashita et al. ........ 73/504.04 |
| 6,201,629 | B1 | * | 3/2001 | McClelland et al. ........ 359/223 |
| 6,220,694 | B1 | * | 4/2001 | Silverbrook ................. 347/54 |
| 6,414,823 | B1 | * | 7/2002 | Crane et al. ............. 360/294.5 |
| 6,583,031 | B2 | * | 6/2003 | Lin ............................ 438/459 |

(Continued)

FOREIGN PATENT DOCUMENTS

DE 43 06 268 9/1994

(Continued)

OTHER PUBLICATIONS

*Patent Abstracts of Japan*, Abstract of Japanese Patent "Optical Deflecting Element", Publication No. 60107017, Jun. 12, 1985, Japanese Application No. 58213927, filed Nov. 16, 1983.

(Continued)

*Primary Examiner*—Dean A. Reichard
*Assistant Examiner*—Jeremy C. Norris
(74) *Attorney, Agent, or Firm*—Lipsitz & McAllister, LLC

(57) ABSTRACT

The problem with a micro-functional unit produced by hybrid-integration microstructure technology, comprising microcomponents which can be used in microstructure technology and codetermine the functioning of the micro-functional unit and at least one support comprising a piece of flat material for receiving the microcomponents, is that of positioning at least some of the microcomponents exactly relative to the support, which can be accomplished in that a freely extending finger is formed from the piece of flat material of the respective support by means of two openings located opposite one another and passing through the entire support and that the finger serves as a holding element for one of the microcomponents.

20 Claims, 4 Drawing Sheets

U.S. PATENT DOCUMENTS 6,734,512 B2 * 5/2004 Suzuki .................... 257/414

FOREIGN PATENT DOCUMENTS

| EP | 0 550 973 | 7/1993 |
| EP | 0 866 345 | 9/1998 |

OTHER PUBLICATIONS

Cavicchi, R.E. et al., "Fast Temperature Programmed Sensing for Micro-Hotplate Gas Sensors," *IEEE Electron Device Letters*, vol. 16, No. 6, Jun. 1995, pp. 286-288.

Gajda, M.A. et al., "Applications of Thermal Silicon Sensors on Membranes," *Sensors and Actuators* A 49, 1995, pp. 1-9.

Strandman, Carola et al., "Bulk Silicon Holding Structures for Mounting of Optical Fibers in V-Grooves," *Journal of Microelectromechanical Systems*, vol. 6, No. 1, Mar. 1997, pp. 35-40.

Syms, Richard R.A. et al., "Design of a Microenginerred Electrostatic Quadrupole Lens," *IEEE Transactions on Electron Devices*, vol. 45, No. 11, Nov. 1998, pp. 2304-2311.

Manalis, S.R. et al., "Two-dimensional Micromechanical Bimorph Arrays for Detection of Thermal Radiation," Applied Physics Letters, vol. 70, No. 24, Jun. 16, 1997, pp. 3311-3313.

*Patent Abstracts of Japan*, "Device for Aligning Optical Axis Position of Semiconductor Laser Module", Publication No. 03164705, Jul. 16, 1991.

* cited by examiner

MICRO-FUNCTIONAL UNIT

This application is a continuation of international application number PCT/EP01/03818 filed on Apr. 4, 2001.

This application claims the benefit of German Patent Application No. 100 16 869.8 filed Apr. 5, 2000.

The present disclosure relates to the subject matter disclosed in International application No. PCT/EP01/03818 of Apr. 4, 2001, which is incorporated herein by reference in its entirety and for all purposes.

BACKGROUND OF THE INVENTION

The invention relates to a micro-functional unit produced by hybrid-integration microstructure technology, comprising microcomponents which can be used in microstructure technology and codetermine the functioning of the micro-functional unit and at least one support comprising a piece of flat material for receiving the microcomponents.

In the case of such micro-functional units, there is the problem of positioning at least some of the microcomponents exactly relative to the support.

SUMMARY OF THE INVENTION

This object is accomplished in accordance with the invention, in a micro-functional unit of the type described at the outset, in that a freely extending finger is formed from the piece of flat material of the respective support by means of two openings located opposite one another and passing through the entire support and that the finger serves as a holding element for one of the microcomponents.

The advantage of the inventive solution is to be seen in the fact that the problems of the position-sensitive arrangement of the respective microcomponent may be resolved in a simple manner due to one of the microcomponents being held by a finger designed in accordance with the invention.

For example, such a finger may serve to decouple the position-sensitive microcomponent from the rest of the support since such a finger has a considerably reduced cross section with respect to heat conduction.

In this respect, it is particularly favorable when one or several of such fingers connect a section of the support forming a receiving means for the microcomponent to the remaining area of the support, on which the remaining microcomponents are, for example, arranged.

For example, in this case the position-sensitive microcomponent may be fixed in a simple manner on the section forming the receiving means by way of thermal processes since a thermal heating up of the section supporting the position-sensitive microcomponent is possible in a simple manner without the heat flowing away essentially to the rest of the support and without, as a result, the thermal fixing also taking place in the area of the rest of the support or this fixing being reversed again.

The inventive formation of a finger from the piece of flat material therefore has the advantage that, as a result, a considerable reduction in the thermal coupling is possible without the exact positioning being impaired as a result.

In a further embodiment of the inventive solution it is advantageous when the finger is designed to be elastically resilient, i.e., the finger has such a dimension that the material of the piece of flat material forming the finger conveys spring-elastic properties to the finger.

Such an elastically resilient formation of the finger is conceivable for the most varied of uses.

For example, such a spring-elastic formation of the finger could serve to decouple one microcomponent from the rest of the support with a view to vibrations.

A particularly favorable solution provides, however, for the finger to be arranged so as to be located opposite a receiving means for the microcomponent.

In this case, the receiving means may be designed such that it determines a defined positioning of the microcomponent while the finger sees to it that the microcomponent is always acted upon by the finger in the direction of the receiving means with a spring-elastic force and, therefore, the position predetermined by the receiving means is maintained.

In this respect, it has proven to be particularly favorable when the finger is connected with a first end to a remaining section of the support.

For example, the finger could likewise be connected to the support again with its second end. It is, however, particularly favorable when the finger is freely movable with a second end in relation to the remaining section of the support.

A microcomponent within the meaning of the inventive solution is to be understood as active or passive structural components or structural units, for example, not only optical but also electrical or electronic circuit components or also active or passive mechanical or fluid components in microstructure technology.

Microcomponents of this type are, in particular, electrical or electronic structural elements or structural units, optical structural elements or structural units as well as electro/optical or optically mechanical or electromechanical structural units.

In this respect, it is particularly favorable when a width of the finger is, at the most, twice the thickness of the support, even better corresponds at the most to the thickness of the support.

Furthermore, it is of advantage when the length of the finger is a multiple of the thickness of the support.

Furthermore, the inventive openings may be produced in the piece of flat material of the support by the most varied of processes.

Advantageous production possibilities are a removal of material, such as, for example, laser cutting of the piece of flat material or punching or etching of the piece of flat material, wherein in the case of etching processes, dry etching processes are, in particular, of advantage.

However, it is also conceivable to mold the piece of flat material forming the finger immediately with the openings, for example, to produce the support with the openings by way of injection molding or sintering.

With respect to the design of the receiving means, no further details have so far been given. One advantageous solution provides, for example, for the receiving means to be designed as an opening passing through the entire support.

This allows, in particular, the use of micro-functional units designed as optical components, wherein these can then be penetrated by radiation in a direction extending transversely to the extension of the support.

One advantageous embodiment of the micro-functional unit provides for the opening forming the receiving means to be arranged in the same support as the finger so that the finger and the receiving means may be positioned precisely in relation to one another.

In this respect, it is particularly favorable when the opening forming the receiving means opens towards the opening making the finger freely extending.

A further advantageous solution provides for the micro-functional unit to comprise at least two supports, for the finger to be formed in one of the supports and the receiving means to be arranged in the other support.

In these cases, the microcomponent may be advantageously arranged between the two supports.

This solution is suitable, in particular, for accommodating macroscopic elements, such as, for example, optical imaging elements, such as, for example, spherical lenses. This solution is, however, also suitable for accommodating mechanical components, such as, for example, connector pins.

Where applicable, the supports are arranged at a defined distance from one another by way of spacer elements.

With respect to the overall construction of the microfunctional unit, no further details have been given in conjunction with the preceding embodiments. An inventive micro-functional unit is preferably built up from several supports.

These supports may be arranged so as to overlap. A particularly favorable solution does, however, provide for the supports to be arranged so as to be located one above the other.

Furthermore, it is advantageous, in particular, in order to position the individual micro-functional units exactly and also ensure their functioning relative to one another when the supports are aligned so as to be positioned exactly relative to one another.

Additional features and advantages of the invention are the subject matter of the following description as well as the drawings illustrating one embodiment of an inventive microfunctional unit.

DETAILED DESCRIPTION OF THE INVENTION

Figure 1:
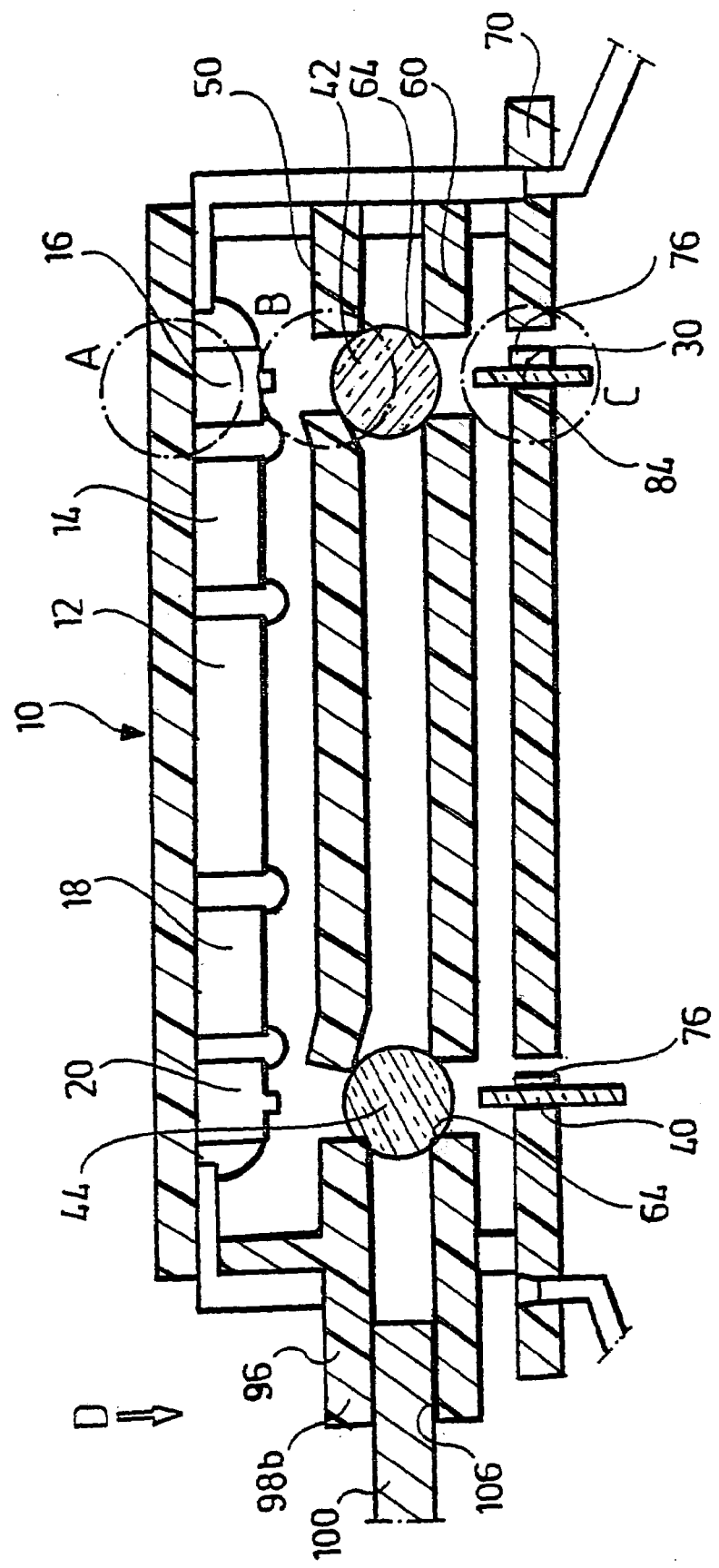
FIG. 1 shows a section through an inventive microfunctional unit.

One embodiment of a micro-functional unit produced by hybrid-integration microstructure technology, illustrated in FIG. 1, comprises a first support 10, on which several microcomponents 12 to 20 are arranged.

Microcomponents of this type can be, for example, an integrated electronic circuit 12, an integrated electronic amplifier circuit 14 which is constructed by a different integration method of construction and an optical detector 16.

Furthermore, a driver circuit 18 produced by a different integration technology is also connected to the integrated electronic circuit and an optical transmitter 20, for example, a semiconductor laser is, on the other hand, connected to it.

Figure 2:
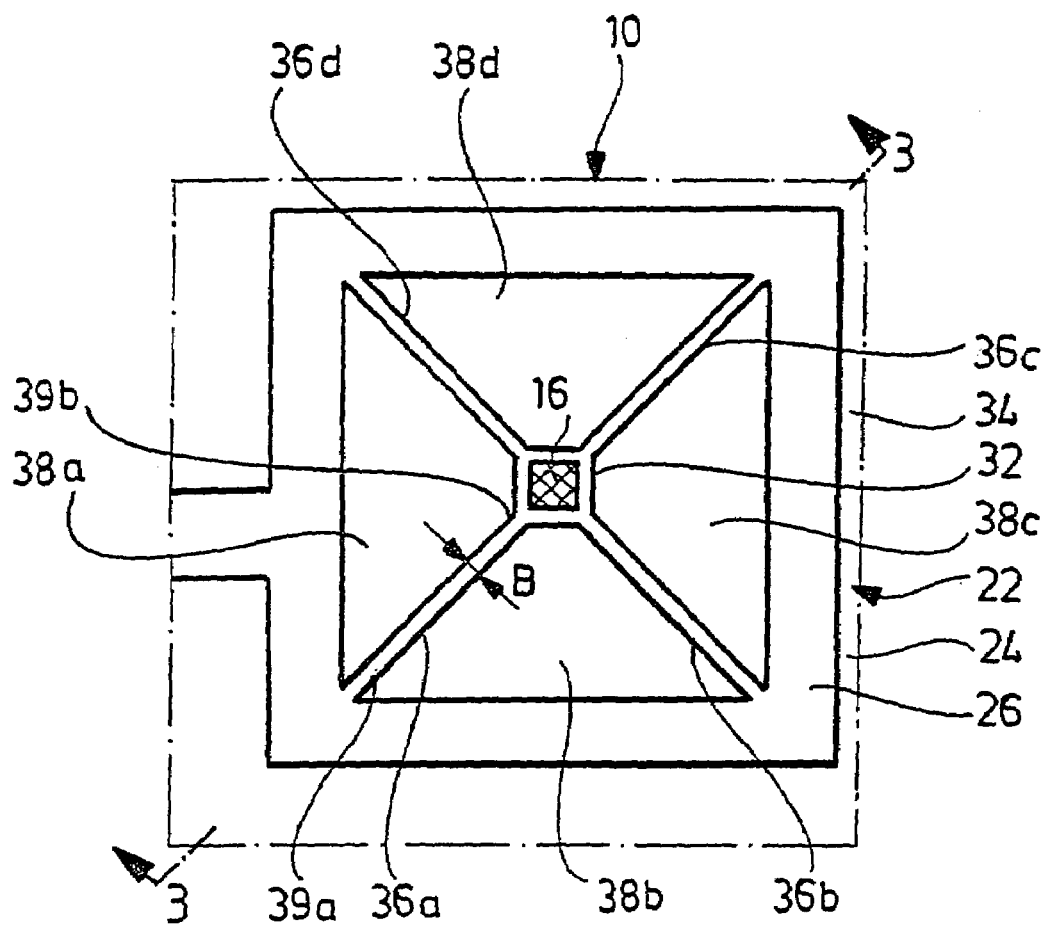
FIG. 2 shows a sectional illustration of an area A of a first support in FIG. 1.
Figure 3:
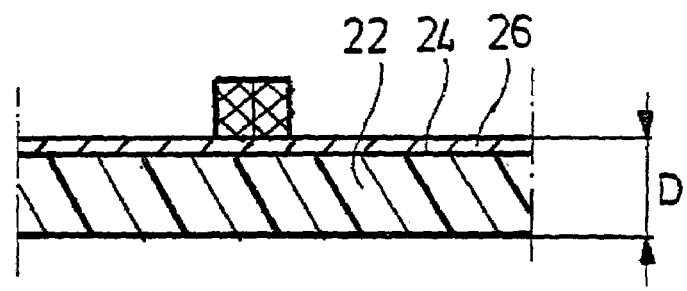
FIG. 3 shows a section along line 3—3 in FIG. 2.

As illustrated in FIGS. 2 and 3, the support 10 comprises a base plate 22 which is designed as a piece of flat material and bears a metallic coating on an upper side 24.

The base plate 22 is produced, for example, from ceramics, plastics, silicon or metal, wherein in the case of a conductive base plate 22 the metallic coating 26 can either be omitted or is insulated by an intermediate layer in relation to the base plate 22.

The optical detector 16 serves to receive electromagnetic radiation supplied via an optical waveguide 30, wherein it is necessary to position the optical detector 16 precisely relative to the optical waveguide 30.

For this purpose, the optical detector 16 is secured to the metallic coating 26 of the support 10, for example, by means of a thermal fixing process, for example, by soldering, wherein such a soldering procedure makes a locally limited heating up of a section 32 of the first support 10 forming a receiving means for the optical detector 16 and supporting, for example, the optical detector 16 necessary.

In order to decouple the section 32 for the soldering of the optical detector by way of a local supply of energy thermally from the remaining areas 34 of the first support 10 as well as possible, the section 32 is connected to the remaining areas 34 by, for example, four fingers 36a, 36b, 36c and 36d which are each located between two respective openings 38a and 38b as well as 38b and 38c as well as 38c and 38d as well as 38d and 38a which are located opposite one another and pass through the first support 10 over its entire thickness so that in the area of each of the fingers 36 a cross section results which is determined, on the one hand, by the thickness D of the first support 10, either predetermined by the thickness of the base plate 22 or by the thickness of the base plate 22 plus the thickness of the metallic coating 26 and, possibly, additional coatings, and by the width B of the fingers 36, wherein the width B is preferably at the most twice the thickness D, preferably corresponds at the most to the thickness D.

For example, the thickness D of the support 10 is in the order of magnitude of approximately 100 μm and the width B is in the range of approximately 10 μm to several 100 μm.

Each of the fingers 36 is connected with a first end 39a to the remaining area 34 of the support 10 and holds the section 32 with a second end 39b.

As a result, the section 32 is, to a great extent, thermally decoupled in relation to the remaining areas 34 of the first support 10 and so a soldering on of the optical detector 16 is possible with a precise positioning by way of a local heating up of the section 32, for example, by means of a laser or with another locally acting source of energy without the fixing of the optical detector 16 on the first support 10 becoming separated again or being impaired by the subsequent, thermal fixing of the remaining microcomponents 12, 14 and 18.

For example, the remaining microcomponents 12, 14 and 18 can be soldered on by means of conventional soldering processes and, subsequently, the optical detector 16 is positioned on the first support 10 separately in a locally precise manner in a special process.

In the same way, an additional section 32 may be determined on the support 10 for receiving the optical transmitter 20 which must likewise be positioned precisely relative to the support 10 in order to be able to couple the entire radiation generated by it into an optical waveguide 40. The required precision is, in this respect, 5 μm or less.

Respective lenses 42 and 44, for example, spherical lenses are provided for the optical coupling between the optical detector 16 and the optical waveguide 30 as well as between the optical transmitter 20 and the optical waveguide 40 and these lenses are held between a second support 50 and a third support 60, wherein the first support 10 as well as the second support 50 and the third support 60 form a stack of supports.

Figure 4:
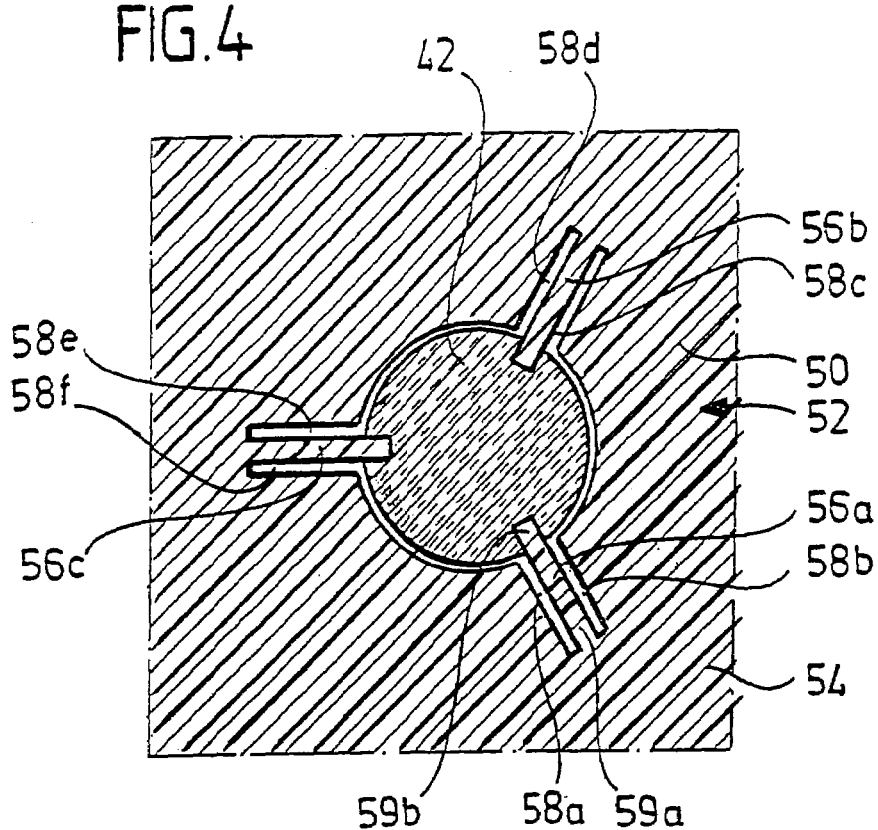
FIG. 4 shows a sectional, enlarged illustration of an area B of a second support in FIG. 1.

Fingers 56*a*, 56*b* and 56*c* are provided on the second support 50 for the locally precise fixing of such lenses 42 and 44, as illustrated in FIGS. 1 and 4 on the basis of the fixing of the lens 42, and these fingers extend freely in relation to a base plate 52 of the support 50 in that openings 58*a*, 58*b*, 58*c*, 58*d* as well as 58*e* and 58*f* are provided on either side of the fingers 56*a*, 56*b* or 56*c*, wherein the fingers 56*a*, b, c merge in the area of a first end 59*a* into a remaining area 54 of the base plate whereas they are freely movable with a second end 59*b* in relation to the remaining area 54 of the base plate, for example, with a deflectability of at the most approximately 100 μm or also only at the most approximately 50 μm, in the case of a dimensioning similar to that of the support 10, and with it are therefore in a position to act on the lens 42 in a spring-elastic manner.

As a result of such a design of the second plate 50, the lenses 42 and 44 may be acted upon in a spring-elastic manner in the direction of receiving means 64 provided for them on the third support 60 so that a precise positioning of the lenses 44 in the inventive micro-functional unit is possible by means of the receiving means 64 in the third support 60.

The type of exactly positioned fixing described for lenses can also be used for connecting elements, for example, solder globules in order to connect printed circuit boards precisely.

Furthermore, the inventive micro-functional unit also comprises a fourth support 70 which forms an additional element of a stack of supports, comprising, for example, the first, second and third supports, which is positioned relative to the first support 10, the second support 50 and the third support 60, for example, by means of orienting pins and which, for its part, serves for the precise positioning of the optical waveguides 30 and 40.

Figure 5:
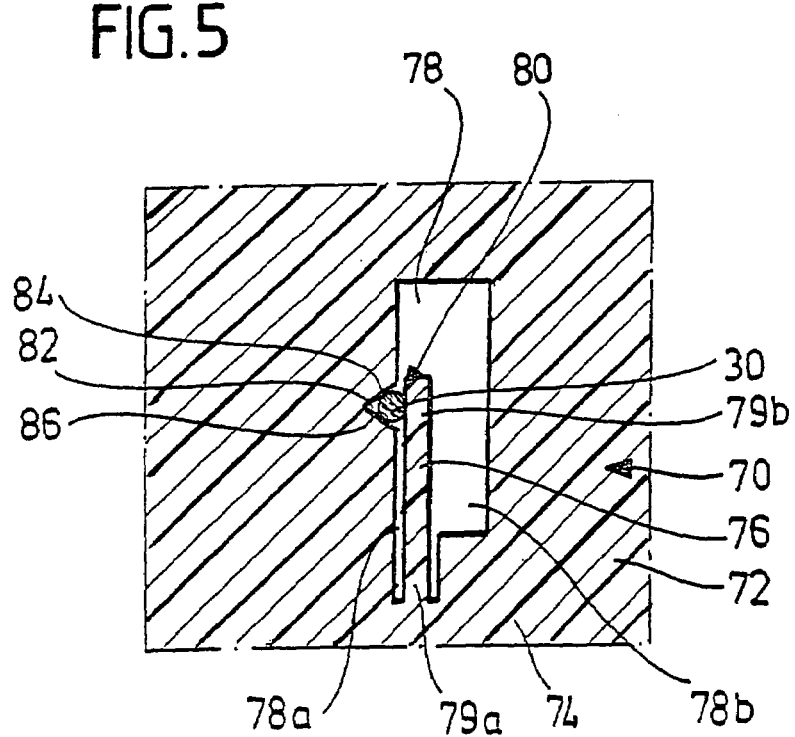
FIG. 5 shows a sectional, enlarged illustration of the area C of a fourth support in FIG. 1.
Figure 6:
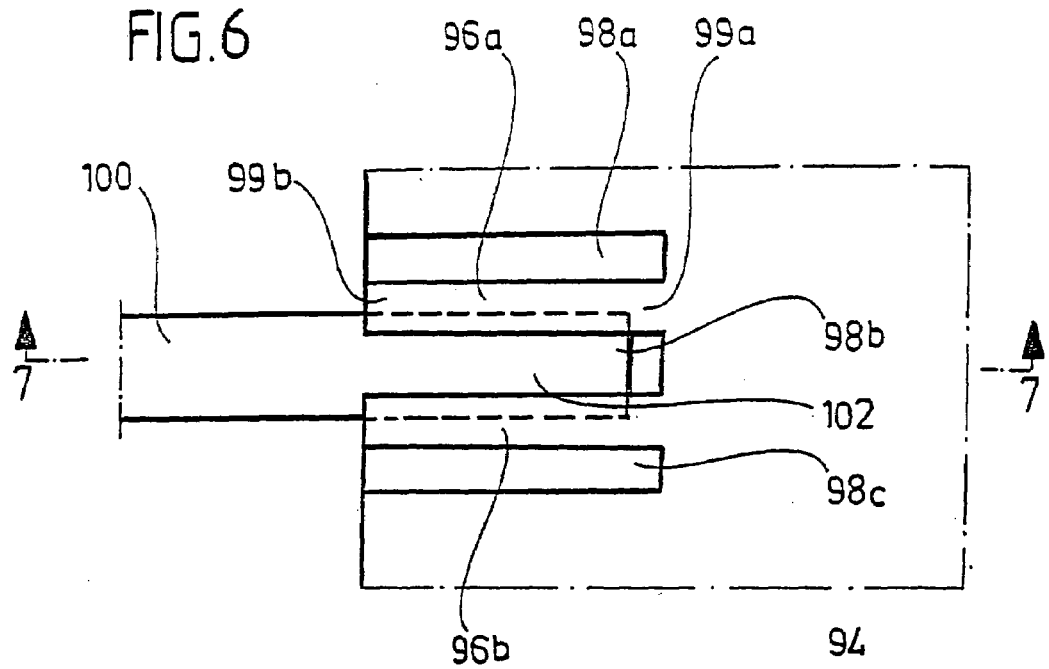
FIG. 6 shows an enlarged plan view in the direction of arrow D in FIG. 1
Figure 7:
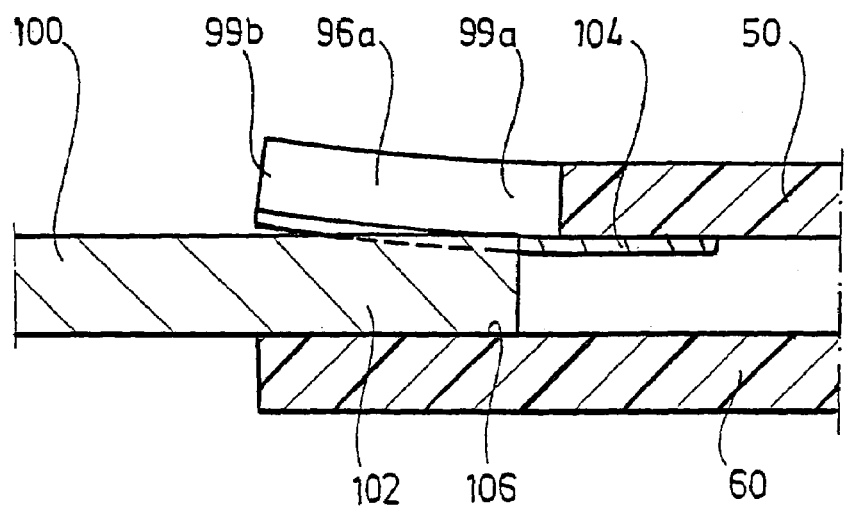
FIG. 7 shows a section along line 7—7 in FIG. 6.

For this purpose, the fourth support 70, as illustrated in FIG. 5, is constructed from a base plate 72 which forms a receiving means 80 for the optical waveguide 30 in that it has an opening 82 which passes through it and is limited laterally by two side walls 84 and 86 extending in a V shape in relation to one another, wherein the side walls 84 and 86 extending in a V shape in relation to one another open in the direction of an additional opening 78 which adjoins the V-shaped opening 82.

A finger 76 is provided in the opening 78 and this finger extends freely in relation to remaining areas 74 of the support 70, is located between partial openings 78*a* and 78*b* forming the opening 78 and merges with a first end 79*a* into the remaining area of the fourth support 70 whereas a second end 79*b* of the finger 76 is freely movable in the opening 78 and, therefore, can be moved away relative to the V-shaped opening 82 in a spring-elastic manner.

If the waveguide 30 is now introduced into the V-shaped opening 82, this abuts on the side walls 84 and 86, is positioned by these exactly relative to the fourth support 70 while the finger 76 acts on the optical waveguide 30 with its second end 79*b*, which can be moved in a spring-elastic manner, in the direction of the side walls 84 and 86 of the V-shaped opening 82.

For this purpose, the finger 76 is arranged prior to the introduction of the optical waveguide 30 such that the inserted optical waveguide 30 leads to an elastic deformation of the finger 76 away from the V-shaped opening 82 so that, as a result, the finger, with an optical waveguide 30 inserted, always acts on the optical waveguide 30 in the direction of the side walls 84 and 86 in a spring-elastic manner.

The type of exactly positioned fixing of the optical waveguides can also be used for the positioning of alignment pins for the exact mechanical alignment of printed circuit boards, supports or microcomponents or for the fixing of contact pins.

Furthermore, the second support 50 is provided at its edges with fingers 96*a* and 96*b* which are separated from the remaining area 94 of the second support 50 by means of openings 98*a* and 98*b* as well as 98*b* and 98*c* and each adjoin the remaining area 94 with their first ends 99*a* and with their second ends 99*b* can be moved freely in relation to the remaining area 94 in a spring-elastic manner.

The fingers 96*a* and 96*b* form, altogether, a receiving means for a contact pin which is designated as a whole as 100 and can be inserted, with a front end area 102 resting on a receiving means 106 on the third support 60, between the second support 50 and the third support 60 and thereby moves the fingers 96*a* and 96*b* in the direction away from the third support 60 so that the front end area 102 is acted upon by the two fingers 96*a* and 96*b* in the direction of the third support 60 and, therefore, a clamping connection for the contact pin 100 is provided.

For the purpose of contact, either the support 50 is provided with a contact layer 104 in the area of its fingers 96*a*, namely on their side facing the front end area 102, or the support 60 is provided with the contact layer with its area forming the receiving means 106 for the front end area 102.

As a result, an electric plug connection to the inventive micro-functional unit can be produced in a simple manner.

The invention claimed is:

1. Micro-functional unit produced by hybrid-integration microstructure technology, comprising:
    at least one microcomponent determining the functioning of the micro-functional unit,
    at least one support separate from said at least one microcomponent, said at least one support comprising at least one piece of flat material forming a receiving means for receiving a micro-element of the at least one microcomponent by physical contact, and
    at least one freely extending finger formed from the at least one piece of flat material of one of the at least one support by means of at least two openings located on at least opposite sides of said at least one finger and passing through the entire piece of flat material,
    said finger being separate from said at least one microcomponent and serving as a holding element for the micro-element by physically contacting said micro-element with an elastically resilient force, said resilient force acting on said micro-element in a direction of said receiving means for the micro-element, said receiving means defining a precise position of said micro-element with respect to one of said at least one support.

2. Micro-functional unit as defined in claim 1, wherein the finger is arranged so as to be located opposite the receiving means for the micro-element.

3. Micro-functional unit as defined in claim 2, wherein the micro-element is always acted upon by the finger with a spring-elastic force in the direction of the receiving means.

4. Micro-functional unit as defined in claim 1, wherein the finger is connected with a first end to a remaining section of the support.

5. Micro-functional unit as defined in claim 4, wherein the finger is freely movable with a second end in relation to the remaining section of the support.

6. Micro-functional unit as defined in claim 1, wherein the finger has a width corresponding at the most to twice the thickness of the support.

7. Micro-functional unit as defined in claim 6, wherein the width corresponds at the most to the thickness of the support.

8. Micro-functional unit as defined in claim 1, wherein the openings arranged on either side of the finger are produced by removal of material.

9. Micro-functional unit as defined in claim 1, wherein the openings provided on either side of the fingers are integrally formed in the piece of flat material during production.

10. Micro-functional unit as defined in claim 1, wherein the receiving means comprises an opening passing through the entire piece of flat material of said at least one support.

11. Micro-functional unit as defined in claim 10, wherein the opening forming the receiving means is arranged in the same support as the finger.

12. Micro-functional unit as defined in claim 11, wherein the opening forming the receiving means opens towards the opening making the finger freely extending.

13. Micro-functional unit as defined in claim 1, wherein:
the micro-functional unit comprises at least two supports,
the finger is formed in one of the at least two supports, and
the receiving means is arranged in another of the at least two supports.

14. Micro-functional unit as defined in claim 13, wherein the microcomponent is arranged between the two supports.

15. Micro-functional unit as defined in claim 1, wherein the micro-functional unit comprises several supports.

16. Micro-functional unit as defined in claim 15, wherein the supports are arranged so as to be located one above the other.

17. Micro-functional unit as defined in claim 15, wherein the supports are aligned so as to be positioned exactly relative to one another.

18. Micro-functional unit as defined in claim 1, wherein at least one of said at least one microcomponent comprises one of an integrated electronic circuit and an optical component.

19. Micro-functional unit as defined in claim 1, wherein said micro-element comprises one of an optical element, a ball-like body, and a pin-like body.

20. Micro-functional unit as defined in claim 1, wherein said at least one microcomponent is adapted for use in microstructure technology.

* * * * *